US009916840B1

(12) United States Patent
Do et al.

(10) Patent No.: US 9,916,840 B1
(45) Date of Patent: Mar. 13, 2018

(54) DELAY ESTIMATION FOR ACOUSTIC ECHO CANCELLATION

(71) Applicant: Amazon Technologies, Inc., Seattle, WA (US)

(72) Inventors: Hoang Do, Mountain View, CA (US); William Burnson, Oakland, CA (US); Michael Klingbeil, Hamden, CT (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/370,271

(22) Filed: Dec. 6, 2016

(51) Int. Cl.
*H04B 3/20* (2006.01)
*G10L 21/0216* (2013.01)
*G10L 25/51* (2013.01)
*G10L 25/06* (2013.01)
*G10L 21/0208* (2013.01)

(52) U.S. Cl.
CPC .......... *G10L 21/0216* (2013.01); *G10L 25/06* (2013.01); *G10L 25/51* (2013.01); *G10L 2021/02082* (2013.01)

(58) Field of Classification Search
CPC ...... G10L 21/0216; G10L 25/06; G10L 25/51
See application file for complete search history.

(56) References Cited

U.S. PATENT DOCUMENTS

| 6,252,967 B1* | 6/2001 | Moore | H04B 1/123 381/56 |
|---|---|---|---|
| 2011/0069829 A1* | 3/2011 | Ramsden | H04M 9/082 379/406.01 |
| 2011/0264447 A1* | 10/2011 | Visser | G10L 25/78 704/208 |

OTHER PUBLICATIONS

Donohue et al., "Performance of phase transform for detecting sound sources with microphone arrays in reverberant and noisy environments," Jul. 2007, Signal Processing, vol. 87, No. 7, pp. 1677-1691, 15 pages.
Knapp et al., "The generalized correlation method of estimation of time delay," Aug. 1976, IEEE Transactions on Acoustics, Speech and Signal Processing, vol. ASSP-24, No. 4, pp. 320-327, 8 pages.

\* cited by examiner

*Primary Examiner* — Simon King
(74) *Attorney, Agent, or Firm* — Lee & Hayes, PLLC

(57) ABSTRACT

A technology for estimating a delay between a far-end audio signal and a near-end audio signal for acoustic echo cancellation is disclosed. A copy of the far-end signal is stored in a speaker buffer and organized in chunks, and a copy of the near-end signal is stored in a microphone buffer and organized in chunks. Cross correlation is performed on each pair of speaker chunks and microphone chunks based on β-PHAse Transform ("PHAT") generalized cross correlation ("GCC"). A peak correlation value can be obtained for each pair of the chunks. Offset values corresponding to the peak correlation values are collected and clustered. A best cluster is selected and the offset value represented by the selected cluster is identified as the estimated delay. Acoustic echo cancellation can be performed on the near-end signal based on the estimated delay.

20 Claims, 7 Drawing Sheets

DELAY ESTIMATION FOR ACOUSTIC ECHO CANCELLATION

BACKGROUND

In voice communications applications, such as a video conferencing system or voice interactions with a voice command device, it is important that users or customers have intelligible and echo-free conversations. Acoustic echo (i.e., when users hear back what they have spoken earlier), can be very detrimental and disruptive to the users' experience in voice communications.

To address the acoustic echo, an audio-processing component called an acoustic echo canceller ("AEC") is often employed. An AEC can remove the echo generated from the far-end signal, e.g., the signal from the other end of a call being played back at a speaker, from the near-end signal. However, the fact that the far-end signal can undergo various types of delays before reaching the microphone increases the difficulty in acoustic echo cancellation. For example, hardware and software of a computing device might cause delay when storing and processing the far-end signal. Likewise, different types of hardware and software platforms can cause different amounts of delays. In addition, various acoustic paths from the speaker to the microphone can also introduce various amounts of delay. Further, these delays can change suddenly when the environment changes, such as when a device goes into or recovers from a low power state, when a Bluetooth device is plugged in the host device, when the device is moved around, and so on.

When the time delay between a near-end signal and a far-end signal is large, it often leads to the failure of common acoustic echo cancellation mechanisms and, consequently, can result in an echo in the near-end signal. As such, it is important to accurately estimate the delay between a near-end signal a far-end signal in voice communications, and to align the signals based on the estimated delay before performing acoustic echo cancellation. The accuracy of the delay estimation can greatly impact the performance of an acoustic echo canceller.

The disclosure made herein is presented with respect to these and other considerations.

DETAILED DESCRIPTION

Figure 1:
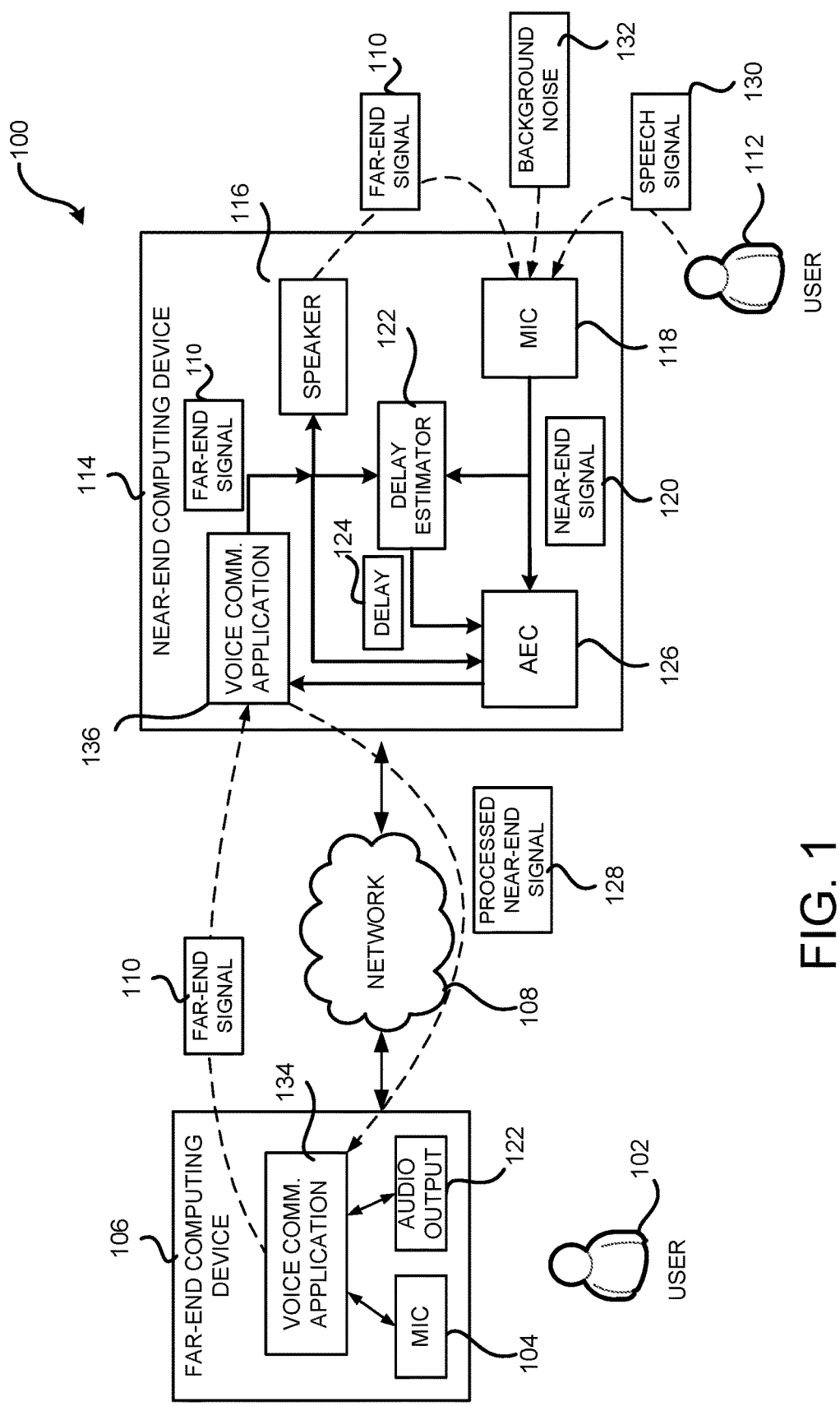
FIG. 1 is a system architecture diagram showing aspects of an illustrative operating environment for the technologies disclosed herein for estimating a delay between a near-end signal and a far-end signal for acoustic echo cancelation, according to one configuration disclosed herein.

The following detailed description is directed to technologies for estimating a delay between a near-end audio signal and a far-end audio signal for applications such as acoustic echo cancellation. Through an implementation of the disclosed technologies, an estimated delay between a near-end signal and a far-end signal can be obtained. This estimated delay can be utilized to align the far-end signal with the near-end signal so that further processing, such as acoustic echo cancelation, can be performed on the near-end signal to remove the acoustic echo contained in the near-end signal, thereby improving the quality of the signal.

Compared with existing delay estimation approaches based on time-domain cross correlation, the delay estimation mechanism presented herein is performed in the frequency domain. Further, the cross correlation between the near-end signal and far-end signal can be obtained faster than typical approaches, such as time-domain approaches, thereby increasing the overall speed of delay estimation. This also saves central processing unit ("CPU") time and memory utilization. Additional technical benefits other than those described briefly above can also be realized through an implementation of the technologies disclosed herein.

In order to enable the functionality disclosed herein, a delay estimator is provided that is capable of estimating a delay between a near-end audio signal and a far-end audio signal (which might be referred to herein as a near-end signal and a far-end signal, respectively). The delay estimator can obtain a copy of the far-end signal and a copy of the near-end signal, and divide the signals into chucks. A frequency domain cross-correlation, such as the beta-PHAse Transform ("PHAT") generalized cross correlation ("GCC"), can be performed on each pair of a far-end signal chunk and a near-end signal chunk. The cross correlation can generate a set of correlation values. A peak value among the set of correlation values can be identified. The peak value indicates the possible offset or delay between the far-end signal chunk and a near-end signal chunk.

The peak correlation values from the multiple pairs of chunks can be gathered into one group along with their corresponding offset values, which might also be referred to herein as delay values. The offset values can then be clustered to identify an estimated delay. The clustering can be performed by dividing the group of offset values into multiple clusters. The cluster or clusters having the highest number of offset values can be selected as the "best" cluster. When there exists more than one best cluster, the best cluster having the highest peak correlation value can be selected, and the representative offset value of that cluster can be output as the estimated delay. The estimated delay can be utilized by an acoustic echo canceller to align the near-end signal and far-end signal to perform echo cancelation and, potentially, for other purposes.

To further improve the robustness of the delay estimation, previously estimated delays can be stored in a delay buffer. When the latest estimated delay is calculated, it can be stored in the delay buffer, and a median filter can be applied to the delays stored in the delay buffer so that a smoothed version of the delay can be obtained and fed into the acoustic echo canceller. The estimated delay can also be utilized to determine if a host device has built-in acoustic echo cancelation capability. This information can help to avoid implementing additional acoustic echo cancellation mechanisms when a device already supports acoustic echo cancelation, which can unnecessarily distort near-end audio signals. Additional details regarding the various aspects described briefly above will be provided below with regard to FIGS. 1-7.

It should be appreciated that the subject matter presented herein can be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like. The configurations described herein can also be practiced in distributed computing environments, such as a service provider network, where tasks can be performed by remote computing devices that are linked through a communications network. In a distributed computing environment, program modules can be located in both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures (which might be referred to herein as a "FIG." or "FIGS.").

FIG. 1 is a system architecture diagram showing aspects of an illustrative operating environment for the technologies disclosed herein for estimating a delay between a near-end signal and a far-end signal for acoustic echo cancelation, according to one particular configuration. As shown in FIG. 1, two users, a user 102 and a user 112, can engage in voice communication with each other facilitated by a far-end computing device 106 and a near-end computing device 114. Each of the near-end computing device 114 and the far-end computing device 106 can be a personal computer ("PC"), a desktop workstation, a server computer, a laptop, a notebook, a personal digital assistant ("PDA"), a smartphone, a wearable computing device (such as a smart watch, a smart glass, a virtual reality head-mounted display), a game console, a set-top box, a consumer electronics device, a Voice over Internet Protocol ("VoIP") telephone, a voice command device, or any other computing device capable of connecting to the network 108 and supporting voice communications between its user and another user.

The network 108 can be any wired network, wireless network, or combination thereof. In addition, the network 108 may be a personal area network, local area network ("LAN"), a wide-area network ("WAN"), cable network, satellite network, cellular telephone network, or combination thereof. In addition, the network 108 may be an over-the-air broadcast network (e.g., for radio or television) or a publicly accessible network of linked networks, possibly operated by various distinct parties, such as the Internet. In some embodiments, the network 108 may be a private or semi-private network, such as a corporate or university intranet. The network 106 may include one or more wireless networks, such as a Global System for Mobile Communications ("GSM") network, a Code Division Multiple Access ("CDMA") network, a Long Term Evolution ("LTE") network, or any other type of wireless network.

For example, a user 102 can communicate with another user 112 through a voice communication application 134 executing on the far-end computing device 106 and a voice communication application 136 executing on the near-end computing device 114. The voice communication application 136 can be a standalone application that supports VoIP functionality or a component of an integrated application which provides VoIP as part of the service, such as a video conferencing application. During the communication, the voice communication application 134 can process audio signals captured by a microphone 104 of the far-end computing device 106 and send the audio signals as a far-end signal 110 to the near-end computing device 114. The voice communication application 136 executing on the near-end computing device 114 can receive the far-end signal 110 and send it to a speaker 116 of the near-end computing device 114 for playback.

Likewise, a microphone 118 of the near-end computing device 114 can capture the voice of the user 112 and send it as a near-end signal 120 to the far-end computing device 106. Ideally, the near-end signal 120 would include the voice of the user 112 and some background noise 132. In reality, however, the microphone 118 can also record the audio signal played back by the speaker 116, which can include multiple versions of the far-end signal 110 that undergo various acoustic paths between the speaker 116 and the microphone 118. When such a near-end signal 120 is sent to the far-end computing device 106 and is played through an audio output 122, the user 102 can hear his/her own voice included in the far-end signal 110. This may be referred to as an "acoustic echo" which can, as discussed above, cause a disruptive experience to the user 102.

In order to address this and potentially other problems, an acoustic echo canceller ("AEC") 126 can be included in the near-end computing device 114. The AEC 126 can estimate the impulse response of the acoustic paths between the speaker 116 and the microphone 118. It then can calculate the echo, i.e., the far-end signal changed or distorted by the various acoustic paths, by convolving the far-end signal 110 with the estimated impulse response. The AEC then can remove the acoustic echo by subtracting the estimated echo from the near-end signal 120. The AEC 126 can be implemented as a hardware component of the near-end computing device 114 or a software application executing on the near-end computing device 114.

As discussed above, the far-end signal 110 can undergo various types of delays before re-appearing in the near-end signal 120. The delays can cause misalignment between the far-end signal 110 and near-end signal 120, causing the acoustic echo cancellation performed by the AEC 126 to be ineffective in removing the acoustic echo, i.e. removing the distorted or changed far-end signal 110 from the near-end signal 120. When the delays are large, the performance of the AEC 126 can be significantly impacted, which can even lead to the failure of the AEC 126. This problem can be solved by employing a delay estimator 122 to perform delay estimation based on the far-end signal 110 and the near-end signal 120. The estimated delay 124 can be provided to the AEC 126 for use in aligning the far-end signal 110 and the near-end signal 120 before acoustic echo cancelation is performed.

As briefly discussed above, the delay estimator 122 can obtain the far-end signal 110 and the near-end signal 120, and perform cross correlation between these two signals. A peak of the cross correlation values can indicate the corresponding offset value as a possible delay value between these two signals. Such an offset value can be gathered along with other offset values obtained using additional portions of the far-end signal 110 and the near-end signal 120. These offset values can then be clustered, and the offset value or delay value representing the best cluster can be used as the estimated delay 124. Additional details regarding one mechanism for obtaining the estimated delay 124 are discussed below with regard to FIG. 2.

The estimated delay 124 can be provided to the AEC 126, which can align the far-end signal 110 and the near-end signal 120 based on the estimated delay 124. The aligned signals can then be processed by the AEC 126 using any acoustic echo cancelation technology to generate a processed near-end signal 128 with little or no acoustic echo. The processed near-end signal 128 can then be provided to the voice communication application 136, which can transmit the processed near-end signal 128 to the far-end computing device 106 for playback to the user 102 using the audio output 122.

It should be appreciated that while the AEC 126 and the delay estimator 122 are illustrated only in the near-end computing device 114, they can also be implemented in the far-end computing device 106 to provide delay estimation and acoustic echo cancelation for the signal recorded by the microphone 104 of the far-end computing device 106. In addition, the far-end computing device 106 and the near-end computing device 114 can be different types of devices. For example, the far-end computing device 106 can be a VoIP phone, and the near-end computing device 114 can be a laptop. Likewise, the voice communication application 134 and the voice communication application 136 can also be different types of applications. For instance, the voice communication application 134 can be a firmware dedicated to control the VoIP phone 106, whereas the voice communication application 136 can be a VoIP software application that can be installed and executed on the laptop 114.

Figure 2:
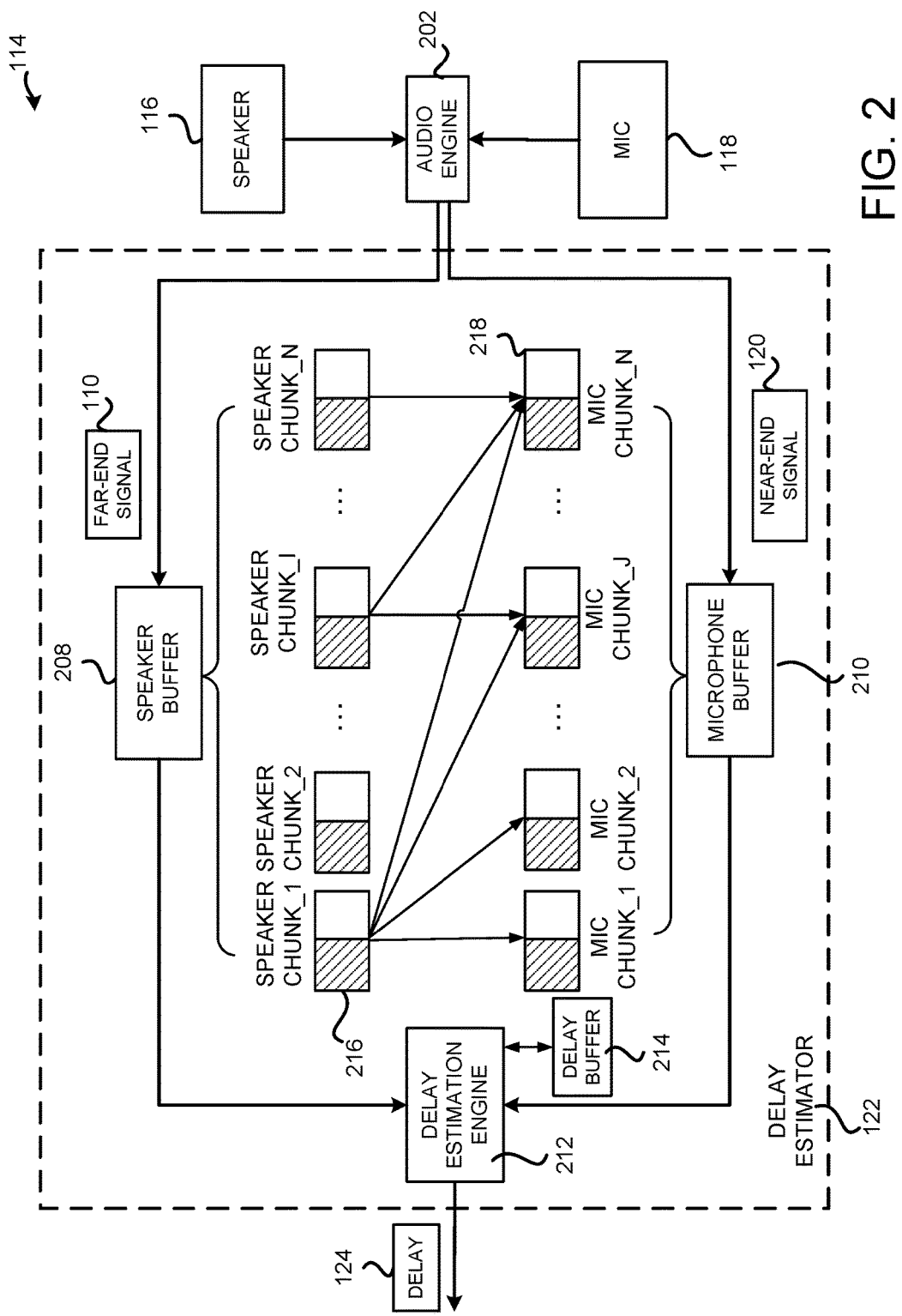
FIG. 2 is a block diagram showing aspects of a delay estimator configured to estimate the delay between a near-end signal and a far-end signal, according to one configuration disclosed herein.

FIG. 2 is a block diagram showing aspects of the delay estimator 122 configured to estimate the delay between a near-end signal 120 and a far-end signal 110, according to one configuration disclosed herein. FIG. 2 will be described in conjunction with FIGS. 3A and 3B, which show an example set of cross-correlation values and example clustering results, respectively.

As shown in FIG. 2, the delay estimator 122 can be configured with a speaker buffer 208 for storing portions of the far-end signal 110 and a microphone buffer 210 for storing portions of the near-end signal 120. An audio engine 202 executing on the near-end computing device 114 can obtain signals for or from the speaker 116 and the microphone 118 as signals become available, and perform analog to digital ("A/D") conversion and/or digital to analog ("D/A") conversion when necessary. The audio engine 202 can also access the far-end signal 110 and the near-end signal 120, and feed the signals into the speaker buffer 208 and the microphone buffer 210, respectively. In one configuration, the audio engine 202 can obtain one frame of the far-end signal 110 each time, such a 10 ms frame. Similarly, the near-end signal 120 can also be retrieved in frames and sent to the microphone buffer 210 by the audio engine 202.

As briefly discussed above, in order to identify the delay between the far-end signal 110 and the near-end signal 120, a cross-correlation can be performed between these two signals. Ideally, the entire far-end signal 110 stored in the speaker buffer 208 should be cross-correlated with the near-end signal 120 stored in the microphone buffer 210 in order to identify the correct delay value. Such a process, however, is very time-consuming and requires high computational resources and memory usage. To reduce the resource consumption and speed up the correlation process, a chunk-based cross-correlation mechanism is employed in one configuration presented herein.

Specifically, the speaker buffer 208 can be configured to organize the received far-end signal 110 into segments, and each segment can have a pre-determined size and can include multiple frames of far-end signal 110 received from the audio engine 202. For example, the audio engine 202 can send the far-end signal 110 to the speaker buffer 208 as 10-ms frames. The speaker buffer 208 can organize the received far-end signal 110 into 128-ms segments. As a result, one segment can contain 12 full frames of far-end signal 110 received from the audio engine 202 and 8-ms signal from the next frame. The remaining 2-ms signal from that frame can be organized into the next segment. Zero padding can be applied to each of the speaker segments by adding zeros to the end of the segment to generate speaker chunks 216. In one implementation, one speaker chunk 216 can include one speaker segment and one zero padding segment with the same length as the speaker segment. In other words, one half of a speaker chunk 216 can be a speaker segment and the other half can be zeros. Organizing the speaker buffer 208 in this way can avoid the circular effect in the frequency domain when performing cross correlation on the signals, as will be discussed later.

The microphone buffer 210 can be organized in a similar way, i.e. one microphone chunk 218 can include a microphone segment and a zero padding segment, and the microphone segment can include audio signals from multiple near-end signal frames. As a result, the speaker buffer 208 can contain N speaker chunks 216 and the microphone buffer 210 can contain N microphone chunks 218. The value of N can be determined by the size of the speaker buffer 208 and the microphone buffer 210, which further determines the amount of delay that the delay estimator 122 can handle.

A delay estimation engine 212 can be included in the delay estimator 122 to estimate the delay between the far-end signal 110 and the near-end signal 120 based on the signal stored in the speaker buffer 208 and the microphone buffer 210. When estimating the delay between the far-end signal 110 and the near-end signal 120, the delay estimation engine 212 can calculate the cross-correlation between these two signals to identify the offset that results in the highest correlation as the estimated delay 124.

As discussed above, in order to reduce the consumption of the CPU time and memory usage and to speed up the process of delay estimation, cross-correlation can be calculated between pairs of speaker chunks 216 and microphone chunks 218, according to one configuration disclosed herein. For example, the cross-correlation can be performed between the pair of speaker chunk 1 and microphone chunk 2, the pair of speaker chunk 1 and microphone chunk 3, the pair of speaker chunk 1 and microphone chunk N, and so on. In summary, cross-correlation can be performed on the pair of speaker chunk i and microphone chunk j, denoted as $$R_{ij} = C(S_i, M_j) \quad (1)$$

where C(x,y) denotes the cross-correlation between x and y; $S_i$ represents the speaker chunk i; $M_j$ represents the microphone chunk j and $1 \leq i \leq N$, and $1 \leq j \leq N$. $S_1$ represents the oldest speaker chunk 216 in the speaker buffer 208, and $S_N$ is the newest speaker chunk 216 in the speaker buffer 208. Similarly, $M_1$ is the oldest microphone chunk 218 in the microphone buffer 210 and $M_N$ is the newest microphone chunk 218 in the microphone buffer 210. $R_{ij}$ is the cross-correlation values between $S_i$ and $M_j$.

In one implementation, considering that the far-end signal 110 is typically contained in the near-end signal 120 that is recorded at a later time, the calculation of cross-correlation can be limited to the pairs of signals that bear a causal relationship between the far-end signal 110 and the near-end signal 120. In other words, the cross-correlation can be calculated for those pairs of signals whose speaker chunk 218 is ahead in time of the microphone chunk 216, i.e. i≤j.

According to configurations disclosed herein, the cross-correlation $R_{ij}$ can be calculated in the frequency domain utilizing a β-PHAse Transform ("PHAT") generalized cross correlation ("GCC"). The β-PHAT GCC can be formulated as follows:

$$R_{ij} = IDFT\left(\frac{DFT(S_i)DFT*(M_j)}{|DFT(S_i)DFT*(M_j)|^\beta}\right) \quad (2)$$

where DFT(x) represents the discrete Fourier transform of x; IDFT(x) represents the inverse discrete Fourier transform of x; * denotes the complex conjugate; |x| denotes the magnitude of x; and β varies between 0 and 1.

The β-PHAT GCC formulated in Eqn. (2) calculates the cross-correlation between audio signals in the frequency domain and, therefore, is faster and more resistant to background noise than time-domain cross-correlation calculation. In addition, the β-PHAT GCC combines phase information and some magnitude information of the correlation, which can achieve a good tradeoff between the robustness and false alarm detection in cross-correlation. Specifically, the phase information in the β-PHAT GCC can help provide accurate correlations because the magnitude of a signal is typically more corrupted by noise than the phase information. This is especially beneficial in the low signal-to-noise-ratio ("SNR") scenarios. By only relying on phase information, however, false correlation can occur when there are periodic signals present in the signals, such as chirp signals. By leaving a small amount of magnitude in the β-PHAT GCC, the high correlation caused by the periodic signal can be suppressed. The amount of magnitude contributed to the β-PHAT GCC can be adjusted by the value of β. In some implementations, β can take a value between 0.6 to 0.9.

The generated $R_{ij}$ can contain a set of cross correlation values $[r_{ij}^1, r_{ij}^2, \ldots, r_{ij}^{2L+1}]$, where L represents the length of a speaker segment or a microphone segment. Each of the cross-correlation value $r_{ij}^k$ corresponds to an offset value or a delay value $\tau_{ij}^k$ between the speaker chunk $S_i$ 216 and the microphone chunk $M_j$ 218. The highest cross-correlation value among $[r_{ij}^1, r_{ij}^2, \ldots, r_{ij}^{2L+1}]$, denoted as $r_{ij}*$, can be identified as the peak correlation value for the pair of $S_i$ and $M_j$ and its corresponding offset value can be denoted as $\tau_{ij}*$.

While the offset value $\tau_{ij}*$ corresponding to the peak correlation value $r_{ij}*$ normally represents the most likely delay between the pair of the speaker chunk $S_i$ and the microphone chunk $M_j$, such an estimation might not be reliable, especially when the peak correlation value $r_{ij}*$ is close to the remaining cross-correlation values. To obtain an accurate delay estimation, a determination can be made regarding the reliability of the peak correlation value $r_{ij}*$. In one configuration, the peak correlation value $r_{ij}*$ is determined to be reliable when the peak correlation value $r_{ij}*$ is higher than a peak correlation threshold, and the ratio between the peak correlation value $r_{ij}*$ and the second-highest cross-correlation value in $[r_{ij}^1, r_{ij}^2, \ldots, r_{ij}^{2L+1}]$ is higher than a ratio threshold.

In some implementations, additional requirements can be applied to the peak correlation value $r_{ij}*$ in order to obtain a reliable result. For example, an additional requirement can be added that requires a ratio of the peak correlation valuer $r_{ij}*$ over a root mean square ("RMS") of all the cross-correlation values in $[r_{ij}^1, r_{ij}^2, \ldots, r_{ij}^{2L+1}]$ is higher than a threshold. If the peak correlation value $r_{ij}*$ satisfies all the above requirements, it can be marked as reliable for future use; otherwise, the peak correlation value $r_{ij}*$ is marked as unreliable.

Figure 3A:
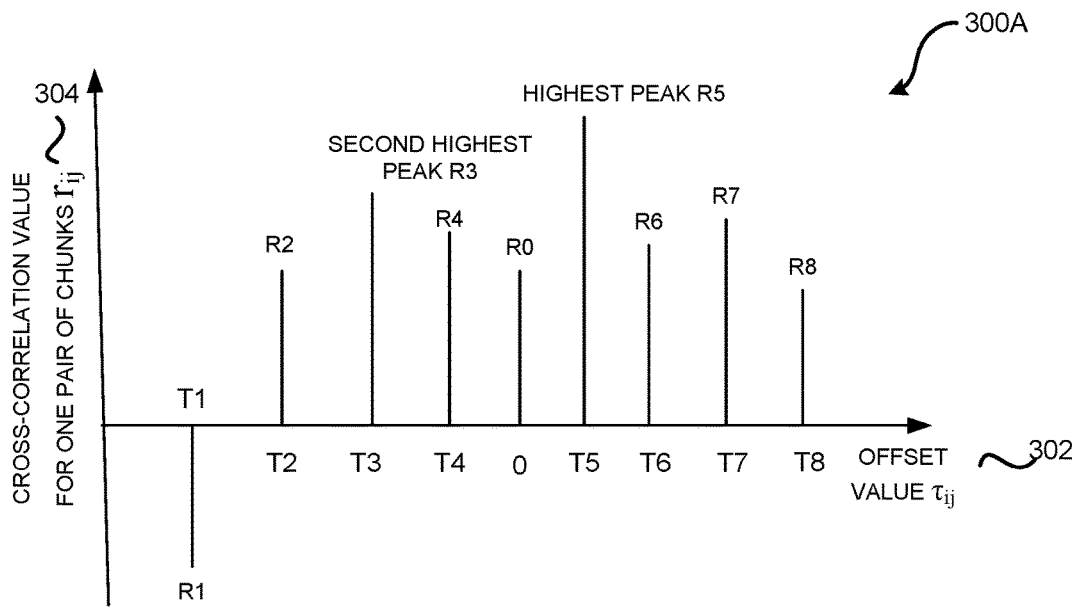
FIG. 3A is a line graph diagram showing an illustrative set of cross correlation values for a pair of far-end and near-end signals, according to one configuration disclosed herein.

FIG. 3A illustrates an example β-PHAT GCC $R_{ij}$, which includes [R0, R1, R2, ..., R8] (shown in the vertical axis 304) corresponding to offset values [T1, T2, ... 0, T8] (shown in the horizontal axis 302). Among these cross-correlation values, R5 has the highest value and thus is identified as the peak value for $R_{ij}$. R3 is the second highest cross-correlation value. As discussed above, the peak value R5 can be identified as reliable if R5>th_1; and R5/R3>th_2, wherein the th_1 is a peak correlation threshold, and th_2 is a ratio threshold. An additional requirement can be applied to the R5 when determining its reliability.

The peak correlation value $r_{ij}*$ for other pairs of the speaker chunk 216 and microphone chunk 218 can be obtained and marked in a similar way. When all the pairs of signals are processed, the delay estimation engine 212 can collect the offset values corresponding to the reliable peak correlation values as a group, and perform clustering on the group of offset values. It should be noted that the offset values between a pair of a speaker chunk i 216 and a microphone chunk j 218 are relative offsets within the pair of chunks. The actual offsets between the far-end signal 110 and the near-end signal 120, i.e. the absolute offsets, can be recovered based on the location of the speaker chunk i 216 in the far-end signal 110 stored in the speaker buffer 208 and the location of the microphone chunk j 218 in the near-end signal 120 stored in the microphone buffer 210.

For example, assume a peak correlation value $r_{12}*$ between the speaker chunk $S_1$ and the microphone chunk $M_2$ occurs at an offset value $\tau_{12}*$ of 8-ms. This "relative" 8-ms offset indicates that the speaker chunk $S_1$ is 8-ms ahead of the microphone chunk $M_2$. Note that the actual data in the speaker chunk $S_1$ is a half chunk (e.g., 128-ms) ahead of the data in the microphone chunk $M_2$. Therefore, taking the half chunk offset into account, the "absolute delay" between the far-end signal 110 and the near-end signal 120 would be 8+128=136 ms, or the far-end signal 110 is 136-ms ahead of the near-end signal 120.

In the example shown in FIG. 3A, if the peak correlation value R5 is determined to be reliable, its corresponding offset value T5 can be converted to the absolute offset and then added to the group of offset values corresponding to reliable peak correlation values for clustering.

According to one configuration, the clustering can be performed by building clusters according to the offset values, each cluster having a fixed size of offset range, e.g. 4 ms. The cluster having the most offset values contained therein can be identified as the "best" cluster. If there are multiple clusters containing the most offset values, the cluster having the highest quality score among those multiple clusters can be selected as the best cluster. The quality score of a cluster can be measured by the highest peak correlation value of that cluster, whose value might be further normalized to be between 0 and 1.

As discussed above, noise in the signals, especially the near-end signal 120, can distort the cross-correlation values, thereby causing unreliable clustering results and leading to inaccurate estimation of the delay 124. In order to further increase the accuracy of the estimated delay, the delay estimation engine 212 can decide whether to utilize the identified best cluster in the delay estimation based on a determination regarding the reliability of the best cluster. In one configuration, a best cluster is determined to be reliable if the best cluster has a size greater than a size threshold and a quality score higher than a quality threshold. The representative offset value of a reliable best cluster can be output as the estimated delay 124. If the best cluster is determined as unreliable, the delay estimation engine 212 can decide to discard the identified best cluster and continue the use of a previously estimated delay.

Figure 3B:
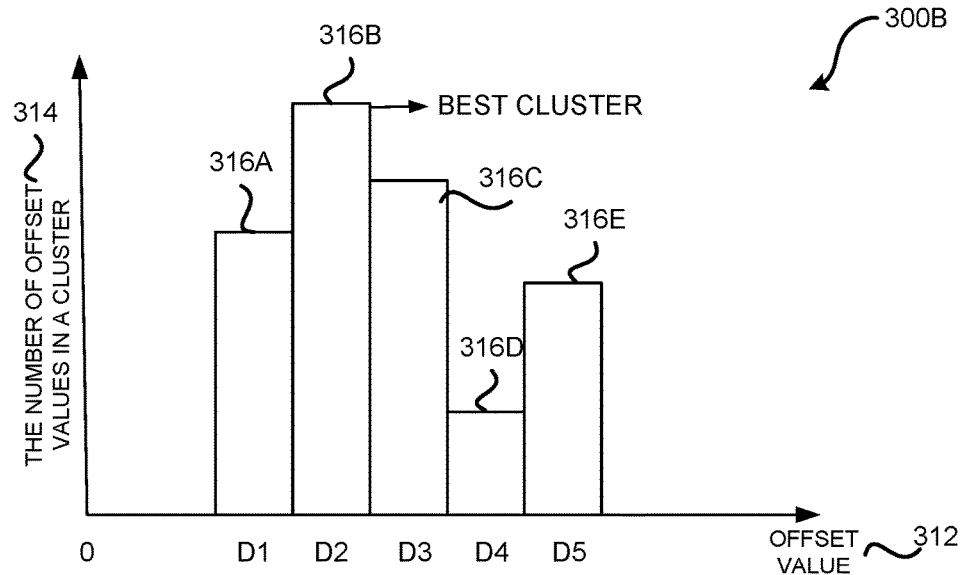
FIG. 3B is a histogram showing an illustrative clustering of a group of offset values, according to one particular configuration disclosed herein.

FIG. 3B illustrates a histogram 300B representing the clustering of the offset values corresponding to peak correlation values of the pairs of speaker chunks 216 and microphone chunks 218. The horizontal axis of the histogram is the offset value and the vertical axis is the number of offset values falling into each cluster. Each bin 316 of the histogram 300B represents one cluster. In the example shown in FIG. 3B, the cluster 316B contains the most offset values, and thus it is identified as the best cluster. If the best cluster 316B can pass the reliability test, the offset value D2 representing this cluster can be output by the delay estimation engine 212 as the estimated delay 124.

As discussed above, periodic signals can cause problems in the estimation of delay based on cross-correlation in that the periodic signals can generate high correlation values even at the incorrect offset values. Although the β-PHAT GCC utilized in calculating the cross-correlation has a built-in mechanism to mitigate the negative impact of the periodic signals, it might not be effective when the periodic signal is strong. Fortunately, when the periodic signal is strong, the cross-correlation values $R_{ij}$ itself can reflect the existence of the periodic signals in the far-end signal 110 and the near-end signal 120.

Typically, the existence of a periodic signal can lead to a pattern in the cross-correlation values $R_{ij}$ where the highest cross-correlation value, the second highest cross-correlation value, and the lowest dip of the cross-correlation value resides at −L, 0 and +L, respectively. As mentioned above, L is the size of the speaker segment or the microphone segment. If such a pattern is observed in any of the $R_{ij}$, the delay estimation engine 212 can determine that a periodic signal exists in the far-end signal 110 and/or the near-end signal 120, and the delay estimation based on the cross-correlation would not be accurate. The current estimation can then be terminated, and a previously estimated delay 124 can be used until new far-end signals 110 and near-end signals 120 are received to enable a new round of delay estimation.

Even if the delay estimation engine 212 determines that there is no periodic signal and that the best cluster is reliable, in some cases the estimated delay might still be unusable if the estimated delay is dramatically different from the delays estimated previously. Feeding such a delay to the AEC 126 can cause sudden changes in the processed near-end signal 128, thereby resulting in an unpleasant experience to the user. To avoid such a problem, a median filter can be applied to the estimated delay generated from the best cluster.

In one configuration, the delay estimation engine 212 can maintain a delay buffer 214 for storing the latest q estimated delays. Each time, a new estimated delay is generated from a reliable best cluster, the estimated delay is pushed into the delay buffer, and then a q-frame median filter can be applied to the estimated delays in the delay buffer 214. The median delay output by the filter can be the ultimate delay 124 to be sent to the AEC 126.

The AEC 126 can align the far-end signal 110 and the near-end signal 120 based on the estimated delay 124, and perform acoustic echo cancellation. For example, the AEC 126 can subtract the echo estimated from the aligned far-end signal from the aligned near-end signal and apply various filters to further process the generated signal before playback to the user 102 at the far-end computing device 106. Additional details regarding the estimation of the delay 124 is discussed below with regard to FIGS. 4 and 5.

Figure 4:
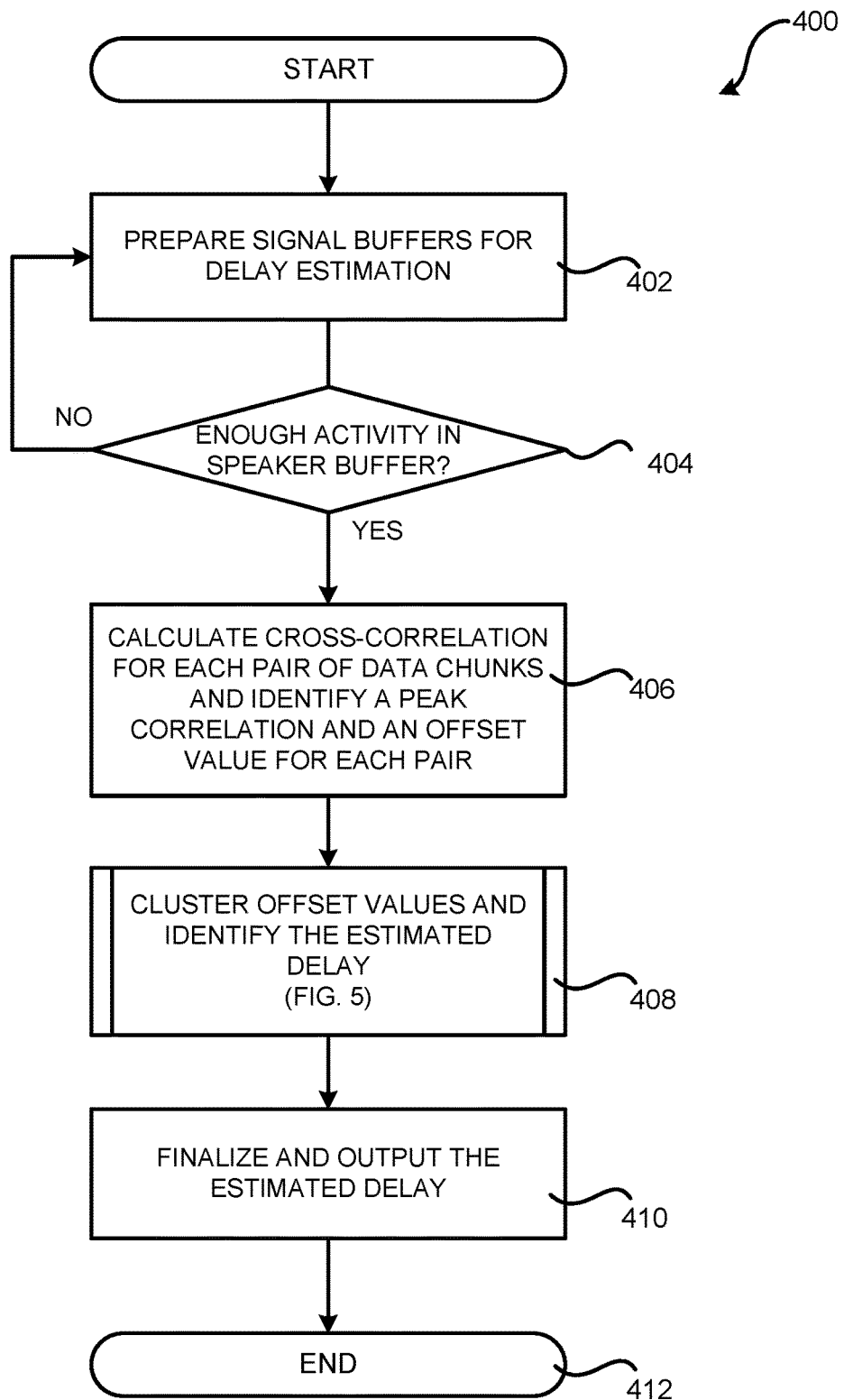
FIG. 4 is a flow diagram showing a routine that illustrates aspects of a method for estimating a delay between a near-end signal and a far-end signal, according to one configuration disclosed herein.

FIG. 4 is a flow diagram showing a routine 400 that illustrates aspects of a method of estimating a delay between a near-end signal 120 and a far-end signal 110, according to one particular configuration disclosed herein. It should be appreciated that the logical operations described herein with respect to FIG. 4, and the other FIGS., can be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special-purpose digital logic, and any combination thereof. It should also be appreciated that more or fewer operations can be performed than shown in the FIGS. and described herein. These operations can also be performed in parallel, or in a different order than those described herein. Some or all of these operations can also be performed by components other than those specifically identified.

The routine 400 begins at operation 402, where the delay estimation engine 212 can prepare the speaker buffer 208 and the microphone buffer 210 for delay estimation. The delay estimation engine 212 can receive one or more frames of far-end signal 110 and near-end signal 120 from the audio engine 202. The received signals can be stored in their corresponding buffers. In addition, the delay estimation engine 212 can arrange the received far-end signal 110 and near-end signal 120 in their corresponding buffers to form speaker segments and microphone segments, respectively.

The delay estimation engine 212 can further apply zero padding as described above to each of the speaker segments and the microphone segments to generate the speaker chunks 216 and the microphone chunks 218. In some implementations, the audio engine 202 can send the far-end signal 110 and the near-end signal 120 as frames, each frame having a size of 10 ms. The speaker segments and the microphone segments can each have a size of 128 ms, and thus the speaker chunks 216 and the microphone chunks 218 each has a size of 256 ms.

From operation 402, the routine 400 proceeds to operation 404, where the delay estimation engine 212 can determine whether there is enough activity in the signal stored in the speaker buffer 208. When the signals in the speaker buffer 208 have no or little activity, it means that there is not much meaningful audio data transmitted from the far-end computing device 106. In those situations, the risk of the far-end signal 110 creating echo in the near-end signal 120 is low, and thus there is no need to perform acoustic echo cancelation, nor the delay estimation.

On the other hand, a large amount of activity in the signals stored in the speaker buffer 208 can indicate that the far-end computing device 106 is actively transmitting meaningful audio data to the near-end computing device 114, and it is very likely that the echo can occur in the near-end signal 120. In one configuration, the data activity in the speaker buffer 208 can be measured by the energy of the signals in the speaker buffer 208. If p % of the data stored in the speaker buffer 208 having an energy higher than an energy threshold, the speaker buffer 208 can be considered as having enough activity and the routine 400 can proceed to operation 406; otherwise, the routine 400 returns to operation 402 to keep receiving new data from the audio engine 202. In one implementation, p takes the value of 50.

At operation 406, the delay estimation engine 212 can perform the cross-correlation on each pair of speaker chunk 216 and microphone chunk 218. Because the system presented herein is a causal system where the speaker signal is normally ahead of the microphone signal, the cross-correlation can be applied to those pairs where the microphone chunk $M_j$ is obtained after the speaker chunk $S_i$, i.e. $i \leq j$. As discussed above, the cross-correlation can be calculated using β-PHAT GCC formulated in Eqn. (2), and β can take a value between 0.6 and 0.9 to achieve a good tradeoff between the resistance to the background noise and false correlation caused by periodic signals. For each pair of the speaker chunk $S_i$ 216 and the microphone chunk $M_j$ 218, a peak correlation value $r_{ij}^*$ can be identified, and its corresponding offset value $\tau_{ij}^*$ can be recorded.

To increase the accuracy of the delay estimation, the peak correlation value $r_{ij}^*$ can be further tested for its reliability. In one configuration, the peak correlation value $r_{ij}^*$ is determined to be reliable when the peak correlation value $r_{ij}^*$ is higher than a peak correlation threshold, and the ratio between the peak correlation value $r_{ij}^*$ and the second-highest cross-correlation value is higher than a ratio threshold. In some implementations, additional requirements can be applied to the peak correlation value $r_{ij}^*$ in order to obtain a reliable result. For example, an additional requirement can be added that requires a ratio of the peak correlation value $r_{ij}^*$ over a root mean square of all the cross-correlation values in $R_{ij}$ to be higher than a threshold. If the peak correlation value $r_{ij}^*$ satisfies all the above requirements, it can be marked as reliable for future use; otherwise, the peak correlation value $r_{ij}^*$ is marked as unreliable.

From operation 406, the routine 400 proceeds to operation 408, where the delay estimation engine 212 gather the offset values and peak correlation values obtained from the various pairs of the speaker chunk $S_i$ 216 and the microphone chunk $M_j$ 218. An estimated delay 124 can be obtained based on these values. Additional details regarding the generation of the estimated delay 124 will be provided below with regard to FIG. 5.

The routine 400 then proceeds to operation 410, where the delay estimation engine 212 can further finalize the estimated delay 124 and output it to the AEC 126. The delay estimation engine 212 can determine whether the estimated delay from operation is a valid delay. As will be discussed below with reference to FIG. 5, the delay estimation engine 212 might determine that the delay estimation based on the offset values and peak correlation values generated from operation 406 is not reliable. In that case, the delay estimation engine 212 can utilize a previously estimated delay as the currently estimated delay 124.

Even if the estimated delay generated in operation 408 is a valid reliable delay, the delay estimation engine 212 can further process the delay by applying a filter on the generated delay to reduce dramatic changes in the estimated delays. Specifically, the delay estimation engine 212 can apply a median filter on the delay generated from operation 408 and previously estimated delays that are stored in a delay buffer 214. The output of the median filter can be utilized as the final estimated delay 124 to be provided to the acoustic echo canceller 126.

Based on the estimated delay 124, the AEC 126 can align the far-end signal 110 and the near-end signal 120, and perform acoustic echo cancellation. For example, the AEC 126 can subtract the echo estimated from the aligned far-end signal from the aligned near-end signal and apply various filters to further process the generated signal before sending it to the far-end computing device 106. The routine 400 then proceeds from operation 410 to operation 412, where it ends.

It should be appreciated that the routine 400 can be repeated when the speaker buffer 208 and the microphone buffer 210 receives new data. For example, the routine 400 can be performed when a certain portion of the speaker buffer 208 and the microphone buffer 210 contain new data, or when the entire data in the speaker buffer 208 and the microphone buffer 210 are new data.

Figure 5:
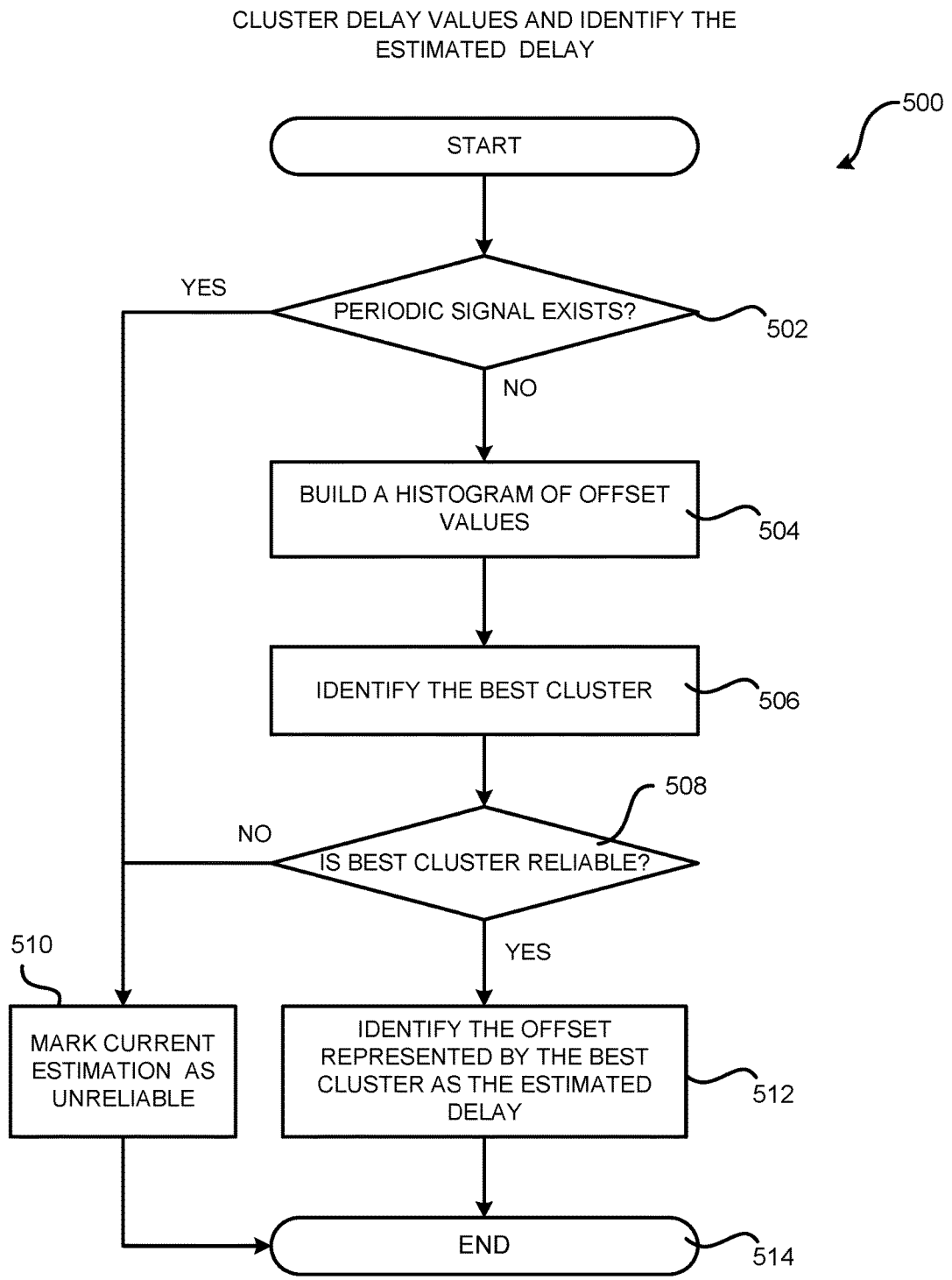
FIG. 5 is a flow diagram showing a routine that illustrates aspects of a method of clustering offset values and identifying an estimated delay, according to one configuration disclosed herein.

FIG. 5 is a flow diagram showing a routine 500 that illustrates aspects of a method for clustering offset values and identifying an estimated delay according to one configuration disclosed herein. The routine 500 begins at operation 502, where the delay estimation engine 212 can detect if there are periodic signals, such as chirp signals, in the far-end signal 110 and the near-end signal 120. As discussed above, periodic signals can cause inaccurate estimation of the delay. Typically, the existence of a periodic signal can lead to a pattern in the cross-correlation values where the highest cross-correlation value, the second highest cross-correlation value, and the lowest dip of the cross-correlation value resides at −L, 0 and +L, respectively. L is the size of the speaker segment or microphone segment. As such, the delay estimation engine 212 can determine the existence of a periodic signal in the far-end signal 110 and/or the near-end signal 120 by observing such a pattern in the cross-correlation values of a pair of a speaker chunk 216 and a microphone chunk 218. If it is determined at operation 502 that a periodic signal exists, the routine 500 proceeds to operation 510, where the delay estimation engine 212 can mark the current delay estimation as unreliable.

If it is determined at operation 502 that there are no periodic signals, the routine 500 proceeds to operation 504, where the delay estimation engine 212 performs clustering on the offset values corresponding to the reliable peak correlation values. The clustering can be performed by building clusters or histograms of the offset values, each cluster or bin having a fixed size of offset range.

The routine 500 then proceeds to operation 506, where the delay estimation engine 212 can identify the best cluster.

According to one configuration, the cluster having the most offset values contained therein can be identified as the best cluster. If there are multiple clusters containing the most offset values, the cluster having the highest quality score among those multiple clusters can be selected as the best cluster. As discussed above, the quality score of a cluster can be measured by the highest peak correlation value of that cluster normalized to be between 0 and 1.

From operation 506, the routine 500 proceeds to operation 508, where the delay estimation engine 212 can determine whether the identified best cluster is reliable or not. A best cluster is determined to be reliable if it satisfies certain criteria. The criteria can include, but are not limited to, the best cluster having a size greater than a size threshold, a quality score of the best cluster being higher than a quality threshold, and so on.

If it is determined at operation 508 that the best cluster is not reliable, the routine 500 proceeds to operation 510, where the delay estimation engine 212 can mark the current estimation as unreliable. If the best cluster is determined to be reliable at operation 508, the routine 500 proceeds to operation 512, where the representative offset value of the reliable best cluster can be output as the estimated delay 124. From operation 512 or operation 510, the routine 500 proceeds to operation 514, where it ends.

In addition to providing an estimated delay between the far-end signal 110 and near-end signal 120 to an AEC 126, the technologies presented herein can also be utilized to detect whether the near-end computing device 114 has built-in acoustic echo cancelation capability or not. This can be achieved by examining the reliability of the best cluster.

If the best clusters for multiple rounds of routines 400 are identified as unreliable, it is very likely that there is no acoustic echo appearing in the near-end signal 120, which suggests that the near-end computing device 114 has a built-in mechanism for acoustic echo cancelation. Detecting the built-in acoustic echo cancellation mechanism can help to avoid the application of additional acoustic echo cancelation on the near-end computing device 114, thereby avoiding additional distortion of the near-end signal 120 and unnecessary processing.

It should be appreciated that while β-PHAT GCC is employed in the example presented above to calculate the cross-correlation between data chunks, any other cross-correlation mechanism known in the art can be utilized. The mechanisms described herein, therefore, should not be read as being limited for use only with β-PHAT GCC. It should be further appreciated that the technologies presented herein are not limited to any specific platform or operation system. As such, it can be implemented on devices having any type of platform or operating system. Likewise, the technologies presented herein can be implemented to address any noise environment or acoustic configuration that the near-end computing device 114 is subject to.

Figure 6:
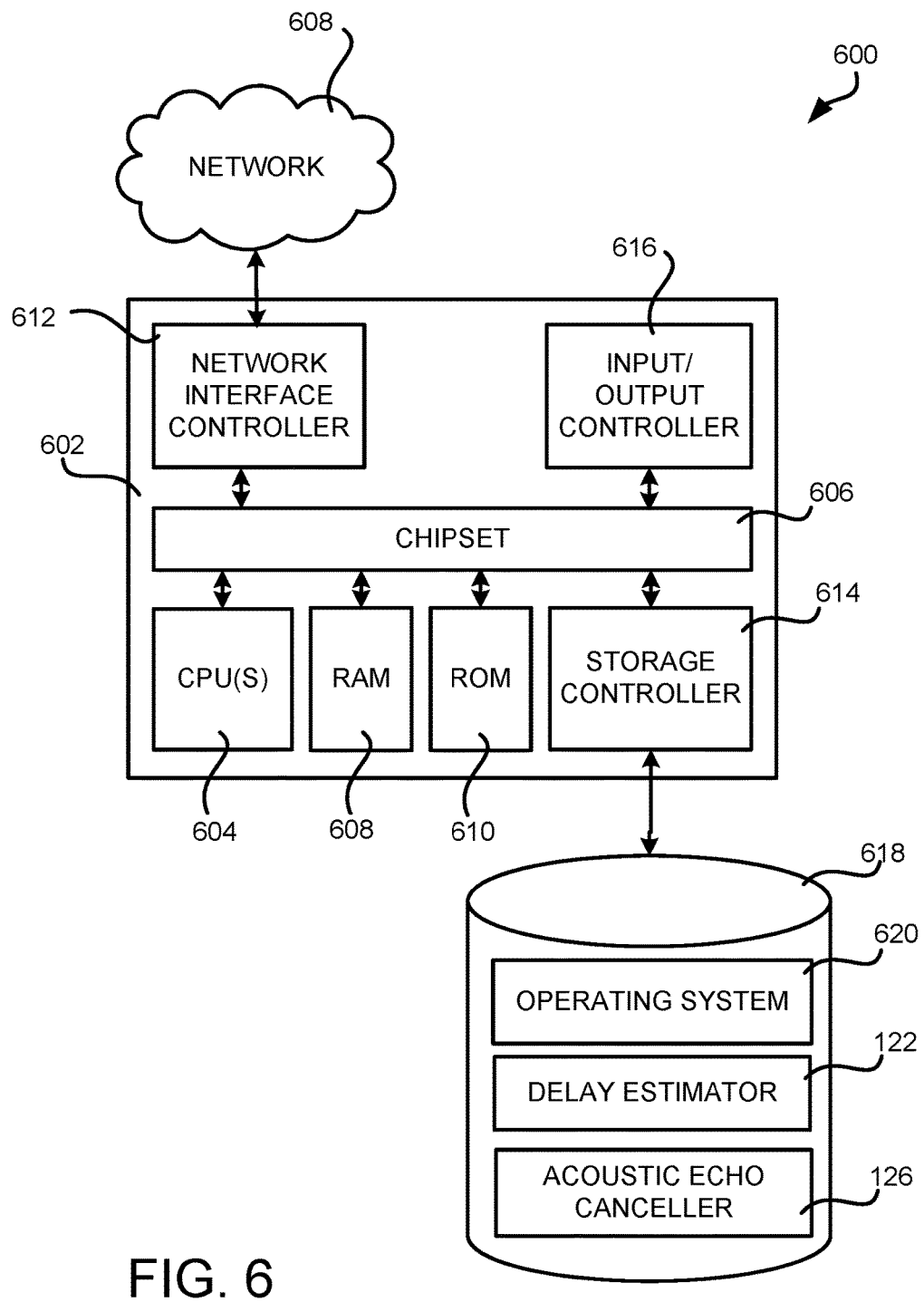
FIG. 6 is a computer architecture diagram showing an illustrative computer hardware architecture for implementing a computing device that can be utilized to implement aspects of the various technologies presented herein.

FIG. 6 shows an example computer architecture for a computer 600 capable of executing program components for implementing the functionality described above. The computer architecture shown in FIG. 6 illustrates a server computer, workstation, desktop computer, laptop, tablet, network appliance, e-reader, smartphone, desktop telephone, Voice over IP ("VoIP") phone, or other computing device, and can be utilized to execute any of the software components presented herein.

The computer 600 includes a baseboard 602, or "motherboard," which is a printed circuit board to which a multitude of components or devices can be connected by way of a system bus or other electrical communication paths. In one illustrative configuration, one or more central processing units ("CPUs") 604 operate in conjunction with a chipset 606. The CPUs 604 can be standard programmable processors that perform arithmetic and logical operations necessary for the operation of the computer 600.

The CPUs 604 perform operations by transitioning from one discrete, physical state to the next through the manipulation of switching elements that differentiate between and change these states. Switching elements can generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 can provide an interface to a RAM 608, used as the main memory in the computer 600. The chipset 606 can further provide an interface to a computer-readable storage medium such as a read-only memory ("ROM") 610 or non-volatile RAM ("NVRAM") for storing basic routines that help to startup the computer 600 and to transfer information between the various components and devices. The ROM 610 or NVRAM can also store other software components necessary for the operation of the computer 600 in accordance with the configurations described herein.

The computer 600 can operate in a networked environment using logical connections to remote computing devices and computer systems through a network, such as the network 608. The chipset 606 can include functionality for providing network connectivity through a MC 612, such as a gigabit Ethernet adapter. The NIC 612 is capable of connecting the computer 600 to other computing devices over the network 608. It should be appreciated that multiple NICs 612 can be present in the computer 600, connecting the computer to other types of networks and remote computer systems.

The computer 600 can be connected to a mass storage device 618 that provides non-volatile storage for the computer. The mass storage device 618 can store an operating system 620, a delay estimator 122, and an acoustic echo canceller 126, which have been described in greater detail herein. The mass storage device 618 can be connected to the computer 600 through a storage controller 614 connected to the chipset 606. The mass storage device 618 can consist of one or more physical storage units. The storage controller 614 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 600 can store data on the mass storage device 618 by transforming the physical state of the physical storage units to reflect the information being stored. The specific transformation of physical state can depend on various factors, in different implementations of this description. Examples of such factors can include, but are not limited to, the technology used to implement the physical storage units, whether the mass storage device 618 is characterized as primary or secondary storage, and the like.

For example, the computer 600 can store information to the mass storage device 618 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 600 can further read information from the mass storage device 618 by detecting the physical states or characteristics of one or more particular locations within the physical storage units.

In addition to the mass storage device 618 described above, the computer 600 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 600.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 618 can store an operating system 620 utilized to control the operation of the computer 600. According to one configuration, the operating system comprises the LINUX operating system. According to another configuration, the operating system comprises the WINDOWS® SERVER operating system from MICROSOFT CORPORATION. According to further configurations, the operating system can comprise the UNIX operating system or one of its variants. It should be appreciated that other operating systems, such as the ANDROID operating system from GOOGLE INC., the iOS operating system from APPLE INC., the WINDOWS PHONE operating system from MICROSOFT Corporation, can also be utilized. The mass storage device 618 can store other system or application programs and data utilized by the computer 600.

In one configuration, the mass storage device 618 or other computer-readable storage media is encoded with computer-executable instructions which, when loaded into the computer 600, make the computing system into a special-purpose computer capable of implementing the configurations described herein. These computer-executable instructions transform the computer 600 by specifying how the CPUs 604 transition between states, as described above. According to one configuration, the computer 600 has access to computer-readable storage media storing computer-executable instructions which, when executed by the computer 600, perform the various processes described above with regard to FIGS. 1-5. The computer 600 can also include computer-readable storage media for performing any of the other computer-implemented operations described herein.

The computer 600 can also include one or more input/output controllers 616 for receiving and processing input from a number of input devices, such as a keyboard, a mouse, a touchpad, a touch screen, an electronic stylus, or other type of input device. Similarly, an input/output controller 616 can provide output to a display, such as a computer monitor, a flat-panel display, a digital projector, a printer, a plotter, or other type of output device. It will be appreciated that the computer 600 might not include all of the components shown in FIG. 6, can include other components that are not explicitly shown in FIG. 6, or might utilize an architecture completely different than that shown in FIG. 6.

Figure 7:
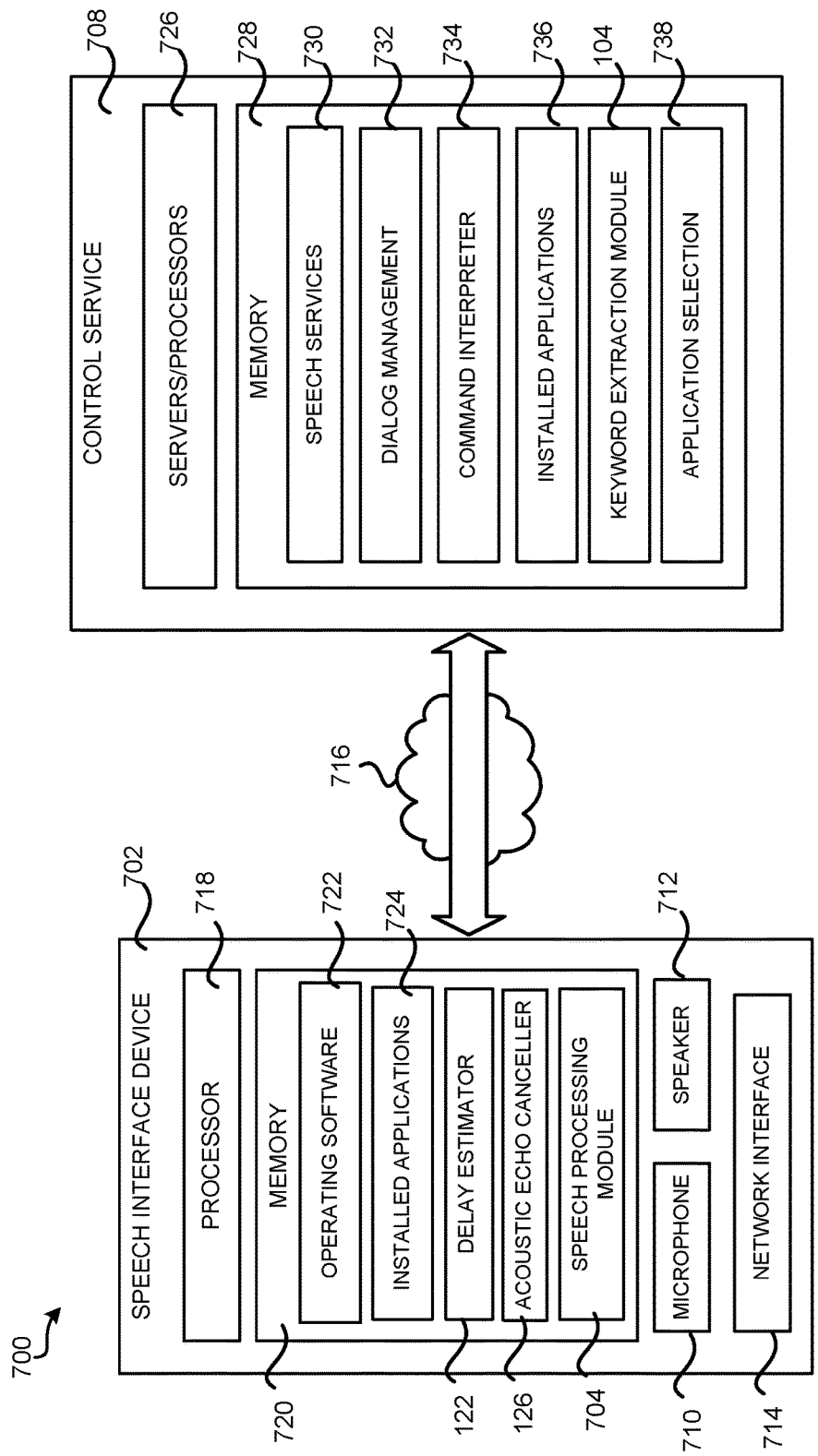
FIG. 7 is a system architecture diagram showing aspects of a user computing device and a control service that can be utilized to implement aspects of the delay estimation mechanism presented herein.

FIG. 7 is a system architecture diagram showing aspects of a voice-based platform or system 700 configured to perform delay estimation between far-end signal and near-end signal and to perform acoustic echo cancellation, according to one configuration disclosed herein. The system 700 can include a speech interface device 702 that is capable of capturing and playing audio. The speech interface device 702 can be a personal computer ("PC"), a desktop workstation, a laptop, a notebook, a personal digital assistant ("PDA"), a smartphone, a wearable computing device (such as a smart watch, a smart glass, a virtual reality head-mounted display), a voice command device (such as a smart voice-enabled wireless speaker), a game console, a set-top box, a consumer electronics device, a server computer, or any other computing device capable of recording, processing and playing back audio signals.

As shown in FIG. 7, the speech interface device 702 can have an audio recording unit, such as one or more microphones 710, and an audio output unit, such as one or more audio speakers or transducers 712, to facilitate speech interactions with a user of the speech interface device 702. The speech interface device 102 can also include a processor 718 and memory 720. Applications, programs and other software can be stored in the memory 720 for execution by the processor 718. The software can include system or operating software 722 that is preinstalled on and integrated with the speech interface device 702. The memory 720 can also contain other applications such as user-installed applications 724 that have been installed by a user of the speech interface device 702.

The speech interface device 702 can have a network communications interface 714 for communications over a communications network 716 with a control service 708 that is configured to receive audio from the speech interface device 702, to recognize speech in the received audio, and to perform or initiate functions or services in response to the recognized speech. The control service 708 can be configured to provide services to large numbers of speech interface devices 702 owned by different users.

Specifically, the control service 708 can be configured to receive an audio stream from the speech interface device 702, to recognize speech in the audio stream, and to determine user intent from the recognized speech. Depending on the nature of the recognized intent, the control service 708 can respond by performing an action or invoking an application to perform an action. In some cases, the control service 708 can determine the intent and return a description of the intent to the speech interface device 702 so that the speech interface device 702 can perform an action in response to the intent. Upon receiving a recognized intent from the control service 708, the speech interface device 702 can invoke one of the user-installed applications 724 to perform an action in fulfillment of the intent.

The control service 708 can include one or more servers, computers, and/or processors 726. The memory 728 of the control service 708 can contain applications, programs, and/or other software, which can include speech services 730. The speech services 730 can include automatic speech recognition (ASR) functionality that recognizes human speech in an audio signal provided by the speech interface device 702 from the microphone 710. The speech services 730 can also include natural language understanding (NLU) functionality that determines user intent based on user speech that is recognized by the speech recognition components. The speech services 730 can also include speech generation functionality that synthesizes or otherwise produces speech audio. For example, the speech generation functionality might be a text-to-speech component that produces speech to be played on the speaker 712 of the speech interface device 702.

The control service 708 can also provide a dialog management component 732 configured to coordinate speech dialogs or interactions with the user of the speech interface device 702 in conjunction with the speech services 730. Speech dialogs can be used to determine or clarify user intents by asking the user for information using speech prompts. The control service 708 can also include a command interpreter and an action dispatcher 734 (referred to below simply as a command interpreter 734) that determines functions or commands corresponding to intents expressed by user speech.

The control service 708 can also be configured to use one or more user-installed applications 736. The control service 708 can also have an application selection component 738 that selects and invokes applications based on recognized intents expressed by user speech.

In one configuration, the control service 708 can also be configured with a AEC 126 and a delay estimator 122 as described above with regard to FIGS. 1 and 2. The delay estimator 122 can estimate a delay between the signal played out through the speaker 712 and the signal recorded using the microphone 710. The estimated delay can be utilized by the AEC 126 to remove the echo in the speech signal captured by the microphone 710 before sending it to the control service 708. The processed near-end signal can be by used by the control service 708 to detect the human speech in the near-end signal, determine the intent of a speaking user based on the processed near-end signal, and/or perform various other services discussed above.

Based on the foregoing, it should be appreciated that technologies for estimating a delay between a far-end signal and a near-end signal for acoustic echo cancellation have been presented herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes can be made to the subject matter described herein without following the example configurations and applications illustrated and described, and without departing from the true spirit and scope of the present invention, which is set forth in the following claims.

What is claimed is:

1. An system, comprising:
   one or more processors;
   at least one speaker;
   at least one microphone; and
   one or more non-transitory computer-readable storage media having instructions stored thereupon which are executable by the one or more processors and which, when executed, cause the system to:
   obtain a far-end audio signal to be played out through the at least one speaker,
   obtain a near-end audio signal captured through the at least one microphone,
   store the far-end audio signal in a speaker buffer and store the near-end audio signal in a microphone buffer,
   perform cross correlation between a chunk of data stored in the speaker buffer and a chunk of data stored in the microphone buffer using a β-PHAse Transform ("PHAT") generalized cross correlation ("GCC") to generate a set of cross correlation values,
   identify a peak correlation value in the set of cross correlation values and a corresponding offset value,
   add the offset value into a group of offset values,
   divide the group of offset values into a plurality of clusters and identify a cluster containing the most offset values as a best cluster,
   identify a delay value corresponding to the best cluster as an estimated delay, and
   cause echo cancellation to be performed on the near-end audio signal using the estimated delay.

2. The system of claim 1, wherein the one or more non-transitory computer-readable storage media have further instructions stored thereupon to cause the system to determine that the peak correlation value is reliable by determining that the peak correlation value is higher than a peak correlation threshold, and wherein the offset value corresponding to the peak correlation value is added to the group of offset values in response to a determination that the peak correlation value is reliable.

3. The system of claim 2, wherein determining that the peak correlation value is reliable further comprises determining that a ratio of the peak correlation value to a second highest value in the set of cross correlation values is higher than a second correlation value threshold.

4. The system of claim 1, wherein the one or more non-transitory computer-readable storage media have further instructions stored thereupon to cause the system to:
   determine that the best cluster is reliable by determining that a number of offset values in the cluster is higher than a size threshold, and that the highest peak value corresponding to the offset values in the cluster is higher than a quality threshold;
   in response to determining that the best cluster is not reliable, cause the echo cancellation to be performed on the near-end audio signal using a previously estimated delay; and
   in response to determining that the best cluster is reliable, identify the delay value corresponding to the best cluster.

5. The system of claim 1, wherein the one or more non-transitory computer-readable storage media have further instructions stored thereupon to cause the system to:
   determine that the system has acoustic echo cancellation functionality based at least in part by determining that the best cluster is not reliable; and prevent an additional acoustic echo canceller from being implemented on the system.

6. A non-transitory computer-readable storage media having instructions stored thereupon that are executable by one or more processors and which, when executed, cause the one or more processors to:

perform cross correlation between a chunk of data stored in a speaker buffer and a chunk of data stored in a microphone buffer to generate a set of cross correlation values, the speaker buffer configured to store far-end audio signals to be played back through a speaker, and the microphone buffer configured to store near-end audio signals captured through a microphone;

identify a peak correlation value in the set of cross correlation values and a corresponding offset value, and add the offset value into a group of offset values;

divide the group of offset values into a plurality of clusters and identify a cluster as a best cluster;

identify a delay value corresponding to the best cluster as an estimated delay; and cause acoustic echo cancellation to be performed on the near-end audio signal using the estimated delay.

7. The computer-readable storage media of claim 6, wherein the cross correlation between the chunk of data stored in the speaker buffer and the chunk of data stored in the microphone buffer is performed by calculating a β-PHAse Transform ("PHAT") generalized cross correlation ("GCC").

8. The computer-readable storage media of claim 6, having further instructions stored thereupon to cause the one or more processors to determine that the peak correlation value is reliable by determining that the peak correlation value is higher than a peak correlation threshold, and wherein the offset value corresponding to the peak correlation value is added into the group of offset values in response to a determination that the peak correlation value is reliable.

9. The computer-readable storage media of claim 6, having further instructions stored thereupon to cause the one or more processors to:

determine that the best cluster is reliable by determining that a number of offset values in the cluster is higher than a size threshold, and that the highest peak value corresponding to the offset values in the cluster is higher than a quality threshold;

in response to determining that the best cluster is not reliable, cause the echo cancellation to be performed on the near-end audio signal using a previously estimated delay; and in response to determining that the best cluster is reliable, identify the delay value corresponding to the best cluster.

10. The computer-readable storage media of claim 6, having further instructions stored thereupon to cause the one or more processors to apply a filter on a plurality of previously estimated delays and the currently estimated delay.

11. The computer-readable storage media of claim 6, wherein the chunk of data stored in the speaker buffer comprises a segment of the far-end audio signal and a segment of a zero energy signal, and wherein the chunk of data stored in the microphone buffer comprises a segment of the near-end audio signal and a segment of the zero energy signal.

12. The computer-readable storage media of claim 6, having further instructions stored thereupon to cause the one or more processors to:

detect that a periodic signal is present based on the set of cross correlation values; and cause the acoustic echo cancellation to be performed on the near-end audio signal using a previously estimated delay.

13. The computer-readable storage media of claim 6, having further instructions stored thereupon to cause the one or more processors to determine that data contained in the speaker buffer has enough activity by determining that an energy of the data in the speaker buffer is higher than an energy threshold, wherein the cross correlation is performed in response to determining that data contained in the speaker buffer has enough activity.

14. A computer-implemented method for estimating a delay between two audio signals, the method comprising:

performing a cross correlation between a chunk of a first audio signal and a chunk of a second audio signal to generate a set of cross correlation values;

identifying a peak correlation value in the set of cross correlation values and a corresponding offset value, and adding the offset value into a group of offset values obtained based on the first audio signal and the second audio signal;

clustering the group of delay values into a plurality of clusters;

selecting a cluster from the plurality of clusters and identifying a delay value corresponding to the selected cluster as an estimated delay; and causing the first audio signal and the second audio signal to be synchronized using the estimated delay.

15. The computer-implemented method of claim 14, wherein the first audio signal is a far-end audio signal to be played back through a speaker of a computing device and wherein the second audio signal is a near-end audio signal captured through a microphone of the computing device.

16. The computer-implemented method of claim 14, wherein a number of offset values in the selected cluster is higher than a number of offset values in any other of the plurality of clusters.

17. The computer-implemented method of claim 16, further comprising:

determining that the selected cluster is reliable by determining that the number of offset values in the selected cluster is higher than a size threshold, and that the highest peak value corresponding to the offset values in the selected cluster is higher than a quality threshold;

in response to determining that the selected cluster is not reliable, causing the synchronization of the first audio signal and the second audio signal to be performed based on a previously estimated delay; and in response to determining that the selected cluster is reliable, identifying the delay value corresponding to the selected cluster.

18. The computer-implemented method of claim 14, wherein the cross correlation between the chunk of the first audio signal and the chunk of the second audio signal is performed by calculating a β-PHAse Transform ("PHAT") generalized cross correlation ("GCC").

19. The computer-implemented method of claim 14, further comprising determining that the peak correlation value is reliable by determining that the peak correlation value is higher than a peak correlation threshold, and wherein the offset value corresponding to the peak correlation value is added into the group of offset values in response to a determination that the peak correlation value is reliable.

20. The computer-implemented method of claim 14, wherein the chunk of the second audio signal is obtained after or around the same time period in which the chunk of the first audio signal is obtained.

\* \* \* \* \*